E. NELSON.
REEL FOR BARBED WIRE.
APPLICATION FILED MAR. 7, 1917.
1,368,648.
Patented Feb. 15, 1921.
2 SHEETS—SHEET 1.
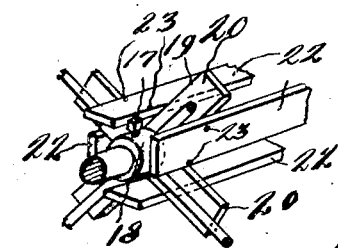
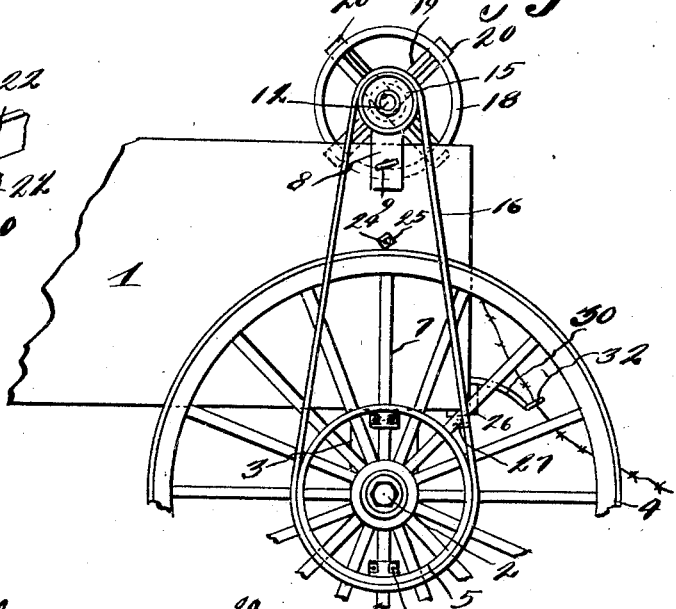
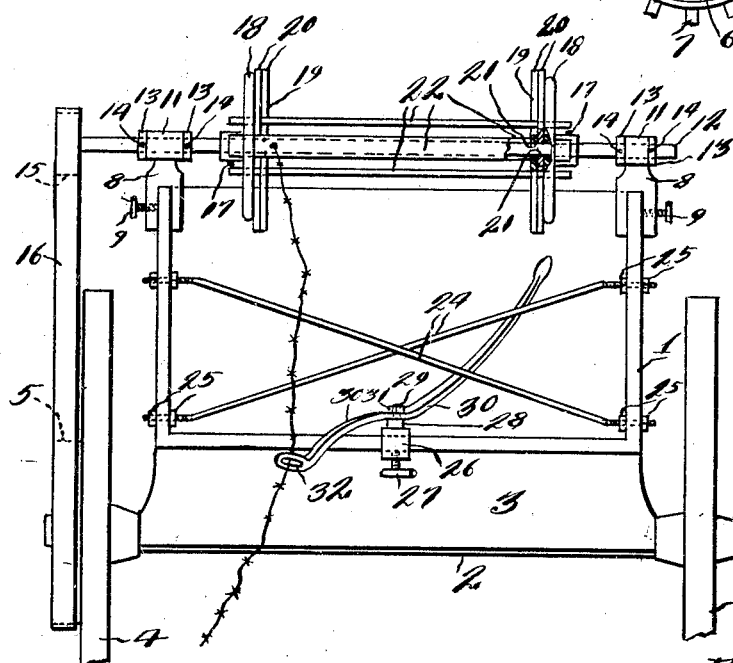
Inventor
E. Nelson
By D. Swift & Co.
Attorneys
Witnesses E. NELSON.
REEL FOR BARBED WIRE.
APPLICATION FILED MAR. 7, 1917.
1,368,648.
Patented Feb. 15, 1921.
2 SHEETS—SHEET 2.
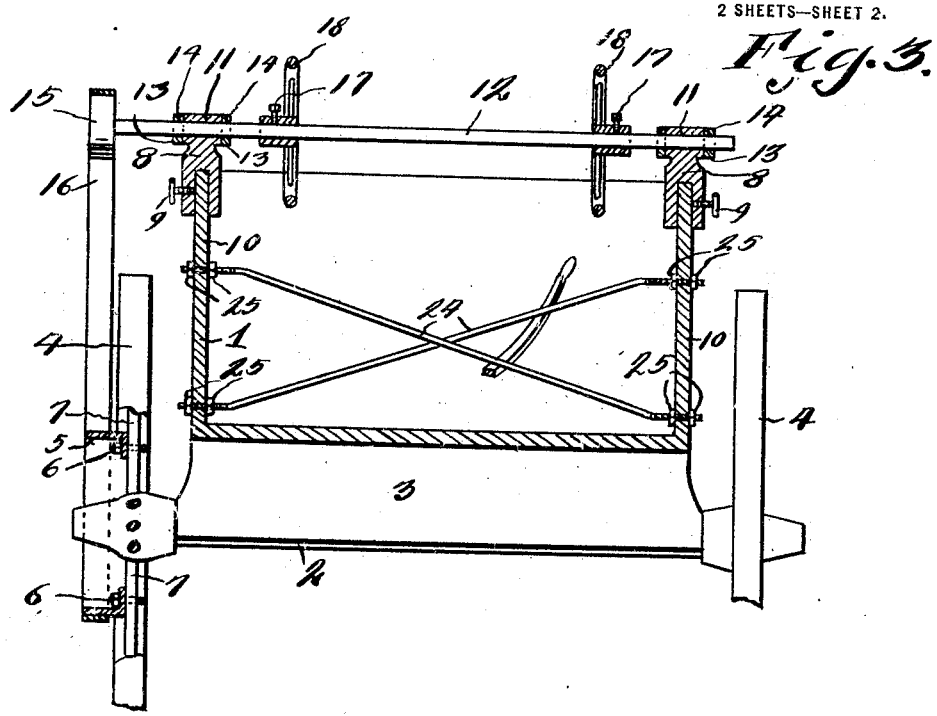
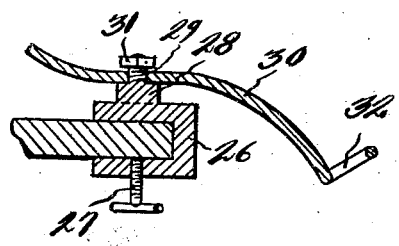

UNITED STATES PATENT OFFICE.

ELMER NELSON, OF HATTON, NORTH DAKOTA.

REEL FOR BARBED WIRE.

1,368,648.

Specification of Letters Patent.   Patented Feb. 15, 1921.

Application filed March 7, 1917. Serial No. 153,109.

*To all whom it may concern:*

Be it known that I, ELMER NELSON, a citizen of the United States, residing at Hatton, in the county of Traill, State of North Dakota, have invented a new and useful Reel for Barbed Wire; and I do hereby declare the following to be a full, clear, and exact description of the invention, such as will enable others skilled in the art to which it appertains to make and use the same.

This invention relates to an improved reeling mechanism for barb wire and the like, and one of the objects of the invention is to provide a mechanism of this kind having gear connections with one of the rear wheels of a wagon or the like, whereby barb wire may be reeled on to a spool as fast as the wagon or other vehicle may travel, and unreel at a corresponding rate of speed.

A further object of the invention is to provide a reeling mechanism portable with the wagon or other vehicle, and having means whereby the conventional form of barb wire holding spool may be clamped or held on the rotating shaft of the reeling mechanism, thereby avoiding the use of a special spool.

A further object of the invention is to provide means for reinforcing the sides of the wagon or other vehicle, thereby preventing the lateral vibrations of the sides of the body of the wagon.

A further object of the invention is the provision of means adjustably carried by the tail end edge of the bottom of the wagon body for guiding the barb or other wire from and onto the spool of the reeling mechanism.

In practical fields, the details of construction may necessitate alterations falling within the scope of what is claimed.

The invention comprises further features and combination of parts, as hereinafter set forth, shown in the drawings and claimed.

In the drawings:—

Figure 1 is a view in side elevation of a wagon or other vehicle, showing the reeling mechanism applied thereto and geared to one of the reel wheels of the wagon.

Fig. 2 is a view in rear elevation of the reeling mechanism, also applied to the wagon or other vehicle body.

Fig. 3 is a view in rear elevation and partly in section, more clearly showing the means for holding the bar or other wire spool on the reel shaft, and illustrating how the pulley rim or band is carried by one of the rear wheels of the vehicle.

Fig. 4 is a detail sectional view of the means which is carried by the tail end edge of the bottom of the wagon body for guiding the barb or wire toward and from the reeling mechanism.

Fig. 5 is a detail perspective view showing a portion of the construction of the conventional form of barb or other wire holding spool, and how the same is clamped on the reel shaft.

Referring more especially to the drawings, 1 designates a conventional form of wagon body, and 2 the rear axle thereof, there being the usual bolster 3 intermediate the axle and the wagon or other vehicle body, and 4 denotes the conventional rear supporting wheels, which are mounted on the spindles of the axle. A circular band 5 is secured by bolts 6 (which pass through the gears 5ª) to the spokes 7 of one of the supporting wheels, thereby affording a pulley consequently rotatable with the supporting wheel. Suitable brackets 8, U-shaped in cross section, are provided, the U-shaped parts of which arch the upper portions of the opposite sides of the wagon or other vehicle body, there being set screws 9, whereby the brackets may be adjustably secured in place upon the opposite sides 10 of the body. These brackets have cylindrical bearings 11, in which a suitable shaft 12 is rotatably mounted, there being collars 13 secured by set screws 14 on the shaft and contacting with the opposite ends of the bearings, to prevent axial movement of the shaft 12. However, these collars may be removed, so that the shaft may be removed from its bearings. One end of the shaft 12 has a pulley 15, about which a suitable belt 16 travels, the same also engaging the pulley rim or band 5, so that, as the wagon or other vehicle traverses the field near the fence, revoluble movement is imparted to the shaft 12. Adjustably secured upon the shaft 12 by means of set screws 17, are the clamping wheels 18, which are of the design shown in the drawing. The spool comprises the head members 19, each of which consists of the intersecting right angle disposed cross pieces 20. These heads, where the pieces 20 intersect or cross, have openings 21 for the reception of the shaft 12. In order to form the body for the spool, the bars 22 are arranged so that their ends are disposed between and secured to the intersecting right angle extending cross pieces 20. The bars 22 are secured to the cross pieces 20, as shown at 23, and it is to be noted that, as the vehicle travels, and the shaft 12 rotates, the barb or other wire may be reeled upon or from the spool, in other words, the wire will wrap about or reel from the bars 22. In applying the spool, the shaft 12 is first removed from its bearings and inserted through the openings 21 of the heads 19, then the wheels 18 are adjusted in order to clamp against the outer faces of the heads, the spokes of the wheel 18 engaging between the end portions of said bars 22, thereby holding the spool in order to rotate with the shaft. The wheels act to prevent axial movement of the spool, while the spokes of the wheels cause the spool to rotate with the shaft. Intersecting rods 24 have their threaded end portions adjustably connected to the sides 10 of the vehicle body by means of the nuts 25, which, when tightened up securely, will so hold the crossing rods 24, as to prevent lateral vibration of the sides of the body, as the vehicle travels over the field. A U-shaped clamp 26 is adjustably secured to the rear end edge portion of the bottom of the vehicle body by means of the set screw 27. This clamp has a boss 28 provided with an extension 29, on which the lever 30 is pivoted, there being a nut 31 threaded on a reduced part of the extension 29, so as to hold the lever pivotally mounted on the extension. The lower rear end of the lever terminates in an eye 32, through which the barb or other wire passes, in order to guide the wire upon and from the spool. As the vehicle travels, an operator, while in the body of the vehicle, may grasp the handle of the lever, and so manipulate the same as to hold the eye in the proper position, in accordance with the wire, as it reels on and from the spool, from one end toward the other. It is to be noted that the clamp 26 may be adjusted, whereby the eye of the lever may be held, in order to more accurately accommodate itself to the motion of the wire.

The invention having been set forth, what is claimed as new and useful, is:—

The combination with a horizontally disposed rotatable reel, of a guide for guiding wire as it is wound on said reel, said guide comprising a horizontally pivoted lever carried by a U-shaped bracket, a set screw carried by said bracket and forming means whereby the lever may be positioned in various positions in relation to the center of the reel, one end of said lever being bent upwardly so as to form a handle, the other end of said lever extending rearwardly and downwardly and terminating in an upwardly inclined loop forming a guide through which the wire slides as it is wound upon the reel, said loop forming means whereby the pivoted lever as the wire is wound on the reel may be utilized for guiding the wire longitudinally as it is wound on the reel and also providing means whereby a pull may be exerted on the wire by a quick swinging of the lever when it is desired to clear the wire of a twist or obstruction.

In testimony whereof I have signed my name to this specification in the presence of two subscribing witnesses.

ELMER NELSON.

Witnesses:
G. H. BOLKEN,
E. HEVESON.